(No Model.)

W. A. SMITH.
HANDLE FOR WASH BOILERS.

No. 459,314. Patented Sept. 8, 1891.

WITNESSES:
Fred G. Dieterich
P. B. Turpin

INVENTOR:
Willard A. Smith.
BY Munn & Co
ATTORNEYS

UNITED STATES PATENT OFFICE.

WILLARD A. SMITH, OF GLENDALE, NEW YORK.

HANDLE FOR WASH-BOILERS.

SPECIFICATION forming part of Letters Patent No. 459,314, dated September 8, 1891.

Application filed November 26, 1889. Serial No. 331,724. (No model.)

*To all whom it may concern:*

Be it known that I, WILLARD A. SMITH, a citizen of the United States, residing in Glendale, in the county of Lewis and State of New York, have invented a new and useful Handle, of which the following is a specification.

The invention is an improved handle applicable to wooden and sheet-metal vessels—
such as wooden tubes, measures, and baskets—and sheet-metal wash-boilers, pails, cans, and the like; and the invention consists in certain novel constructions and combinations of parts, as will be hereinafter described and claimed.

Figure 1:
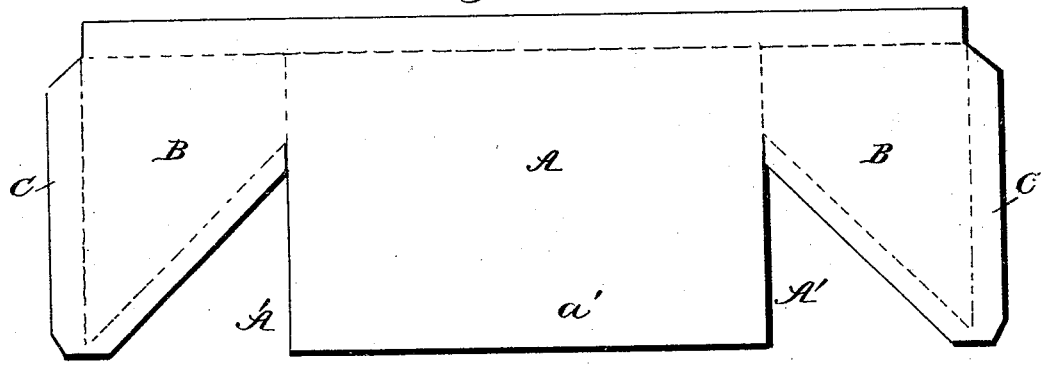
Figure 2:
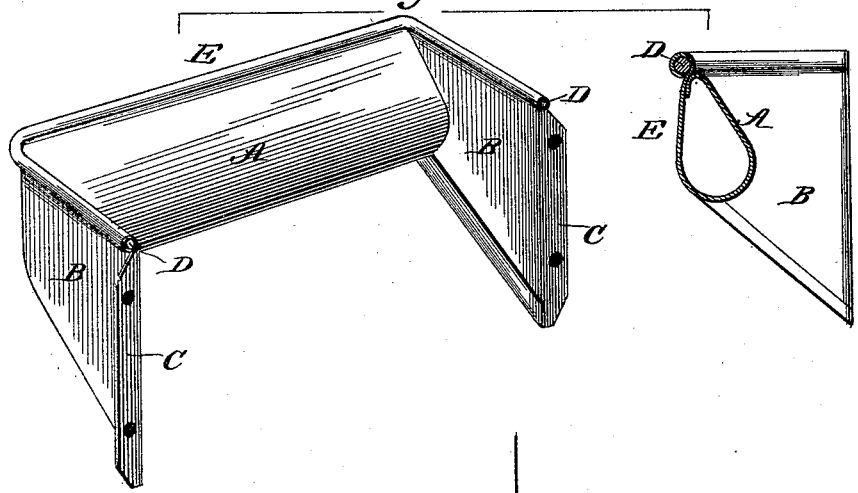
Figure 3:
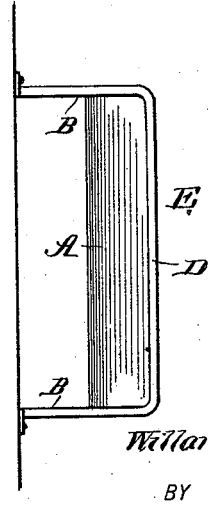

In the drawings, Figure 1 is a view of the blank from which the handle is formed. Fig. 2 shows the handle in both perspective and sectional views; and Fig. 3 shows the handle applied to a vessel, only a portion of the vessel being shown.

The blank A, from which the handle is formed, is made of sheet metal and cut into the form shown in Fig. 1, cut into from its lower edge at A' A' at points distant from its ends equal to the combined width of the side plates B and the flanges C to lap against the vessel to which the handle is applied. The portion $a'$ of the plate between the cuts A' is adapted to be bent up to form a part of the hollow hand-hold, as shown. In Fig. 2 I show the handle finished, ready for application to the vessel.

The blank shown is adapted to receive the wire D, which extends from end to end of the hand-hold or handle proper E and the side plates B. These side plates B are bent at a suitable angle, preferably a right angle, as shown, to the hand-hold, and have their outer edges sloped or cut away from the inner ends of the cuts A'. The portion $a'$ of plate A is turned inward and upward, being rounded in an approximately circular curve at the lower side of the hand-hold and gradually approaching the outer side of the hand-hold toward its upper edge, at which edge it fits against the wired top of the handle proper and is brazed or soldered securely at such point. The side edges of the part $a'$ are brazed or soldered firmly against the inner sides of the side plates B, the hand-hold being thus rendered rigid and firm between the two side plates, and the wiring extending the full length of the handle gives firmness and rigidity thereto.

The hollow hand-hold is quite important, as it furnishes a proper surface for engagement by the hand, and while the special cross-sectional form of the hand-hold may be varied that shown is easy to make, takes but a small quantity of metal, and is very easy to the hand, as the easy curve of the lower side of the handle gives a good grasping-surface, while the gradual tapering of the handle toward its upper edge enables the user to get a strong grip on the handle.

It will be noticed that the improved handle is composed of a single plate of metal cut and bent to form the hollow handle proper or the hand-hold and the side plates. The handle may be riveted or otherwise secured to the vessels to which it is applied.

I do not confine myself to the particular way of making the handle, nor the exact shape in which it is made; but I prefer the way and shape shown.

Having thus described my invention, what I claim, and desire to secure by Letters Patent, is—

1. The improved handle, substantially as described, composed of a plate of metal cut and bent to form the handle proper and the flat side plates at the ends thereof, the portion of the plate forming the handle proper being bent to form a hollow rounded hand-hold and the flat side plates being bent to an angle with the handle proper and abutted flatwise against the same at its ends, all substantially as and for the purpose set forth.

2. An improved handle composed of a plate of metal cut and bent to form the handle proper and the side plates at the ends thereof, having its upper edge wired from end to end of the handle proper and side plates, the handle proper being formed in cross-section, rounded on its lower side, and tapering toward its upper side, substantially as shown and described.

3. A handle formed from a single plate of metal and composed of the side plates and the handle proper, the plate being slitted at the juncture of the handle proper and side plates, such plates being bent to an angle with the handle proper and the portion of the plate forming the handle proper being bent to form a hollow rounded hand-hold, all substantially as and for the purposes set forth.

4. The herein-described improved blank for handles, consisting of a sheet-metal plate having a straight upper edge and having its lower edges cut into or slitted at A' at points equidistant from its ends and having the edges of such cuts nearest the ends of the blank inclined or tapered outward toward the lower edge of the blank, all substantially as described, and for the purpose set forth.

WILLARD A. SMITH.

Witnesses:
M. J. SMITH,
JOHN HERRICK.